Oct. 13, 1953     H. B. STONER ET AL     2,655,244
COIN-CONTROLLED MECHANISM
Filed Dec. 20, 1948                      7 Sheets-Sheet 1

INVENTORS
Harry B. Stoner,
BY Edwin Parre,
Gordon Rogers.
ATT'Y.

Oct. 13, 1953   H. B. STONER ET AL   2,655,244
COIN-CONTROLLED MECHANISM
Filed Dec. 20, 1948   7 Sheets-Sheet 4

INVENTORS
Harry B. Stoner,
Edwin Parre,
BY Gordon Rogers
ATTY.

Oct. 13, 1953   H. B. STONER ET AL   2,655,244
COIN-CONTROLLED MECHANISM
Filed Dec. 20, 1948   7 Sheets-Sheet 7

INVENTORS
Harry B. Stoner,
Edwin Parre,
BY Gordon Rogers
ATTY

Patented Oct. 13, 1953

2,655,244

UNITED STATES PATENT OFFICE 2,655,244

COIN-CONTROLLED MECHANISM

Harry B. Stoner, Aurora, and Edwin Parre and Gordon Rogers, Batavia, Ill., assignors to Stoner Manufacturing Corporation, Aurora, Ill., a corporation of Illinois Application December 20, 1948, Serial No. 66,224

9 Claims. (Cl. 194—55)

The invention relates generally to coin-controlled mechanism, and particularly to mechanism of that character used and associated with machines for vending merchandise.

Vending machines of the kind disclosed in the present application and in which the present invention is embodied are of the type that are manually actuated by the customer to dispense various items of mechandise having different sale prices. Such a machine is generally disclosed in Stoner et al., Patent No. 2,324,040, granted July 13, 1943. The present mechanism is adapted to dispense items having a cost price of ten cents when either a ten-cent coin or two five-cent coins are deposited therein. It also dispenses items having a cost price of five cents when a five-cent coin is deposited and returns a five-cent coin when a ten-cent coin is deposited for the purchase of such five-cent item. It is therefore an object of the present invention to provide a vending machine of the character referred to with novel coin-controlled mechanism.

Coin-controlled vending machines frequently are subjected to considerable rough treatment in attempts to obtain merchandise without depositing the necessary coin or coins or to obtain coins therefrom illegally. It is therefore another object of the invention to provide a coin-controlled mechanism of the character described with an anti-cheat inertia lock.

Another object is to provide a device of the character described with an anti-cheat coin-return lock.

Another object of the invention is to provide, in a coin-controlled device of a kind which includes change-making mechanism, automatic means to prevent acceptance of coins of predetermined denomination when the supply of change coins is exhausted.

Another object of the invention is to provide a vending apparatus with novel mechanism, operable upon actuation of the coin-controlled device, for actuating the change-making mechanism.

Another object is to provide a novel cover for a magazine which contains change coins.

Another object is to provide a coin-discharge gate with novel anti-friction bearings.

Another object is to provide a coin-controlled mechanism with means to release the control elements so that the merchandise racks may be emptied without depositing a coin.

Other and further objects of our invention not at this time particularly enumerated will be made more apparent as the description proceeds, especially when considered in connection with the accompanying drawings wherein:

Figures 1, 2:
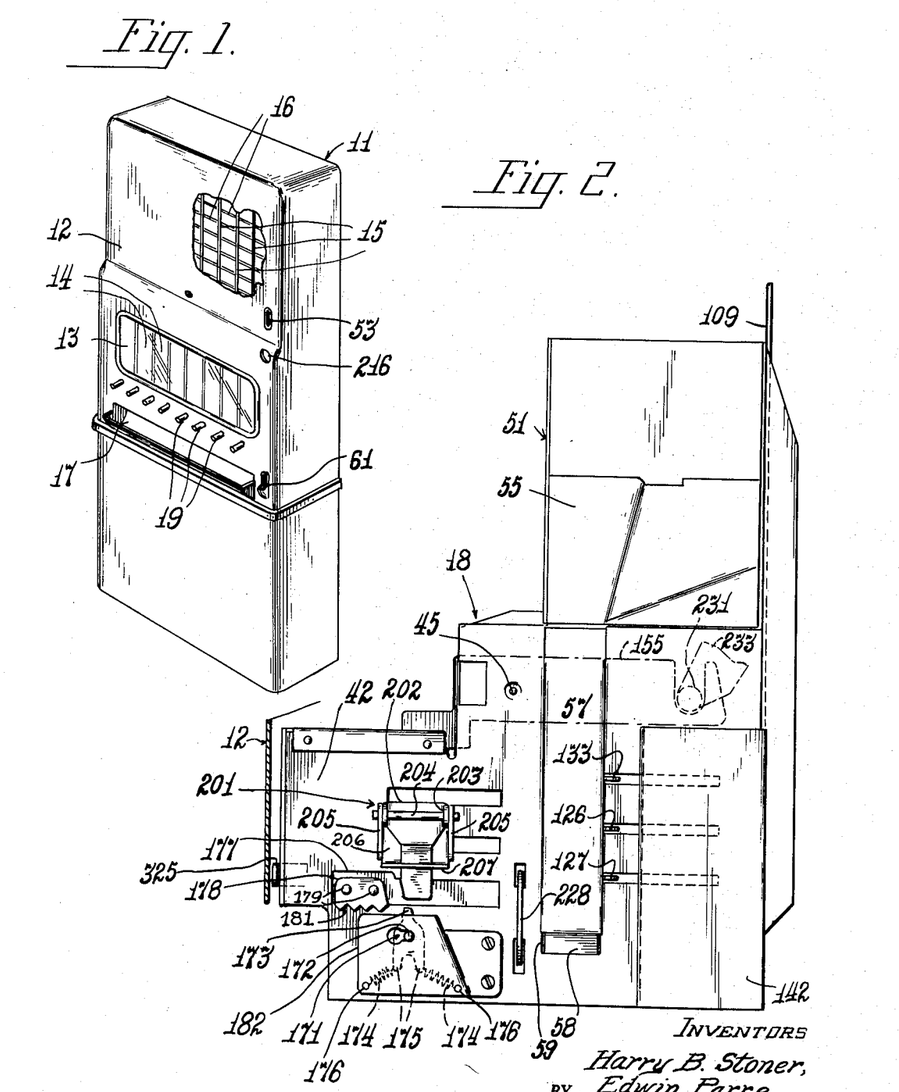
Fig. 1 is a perspective view of a vending machine embodying the features of the present invention, showing parts thereof broken away to more fully illustrate details of the construction.
Fig. 2 is a side elevational view of the coin-controlled mechanism, as viewed from the outside, but with the vending machine casing removed.
Figure 10:
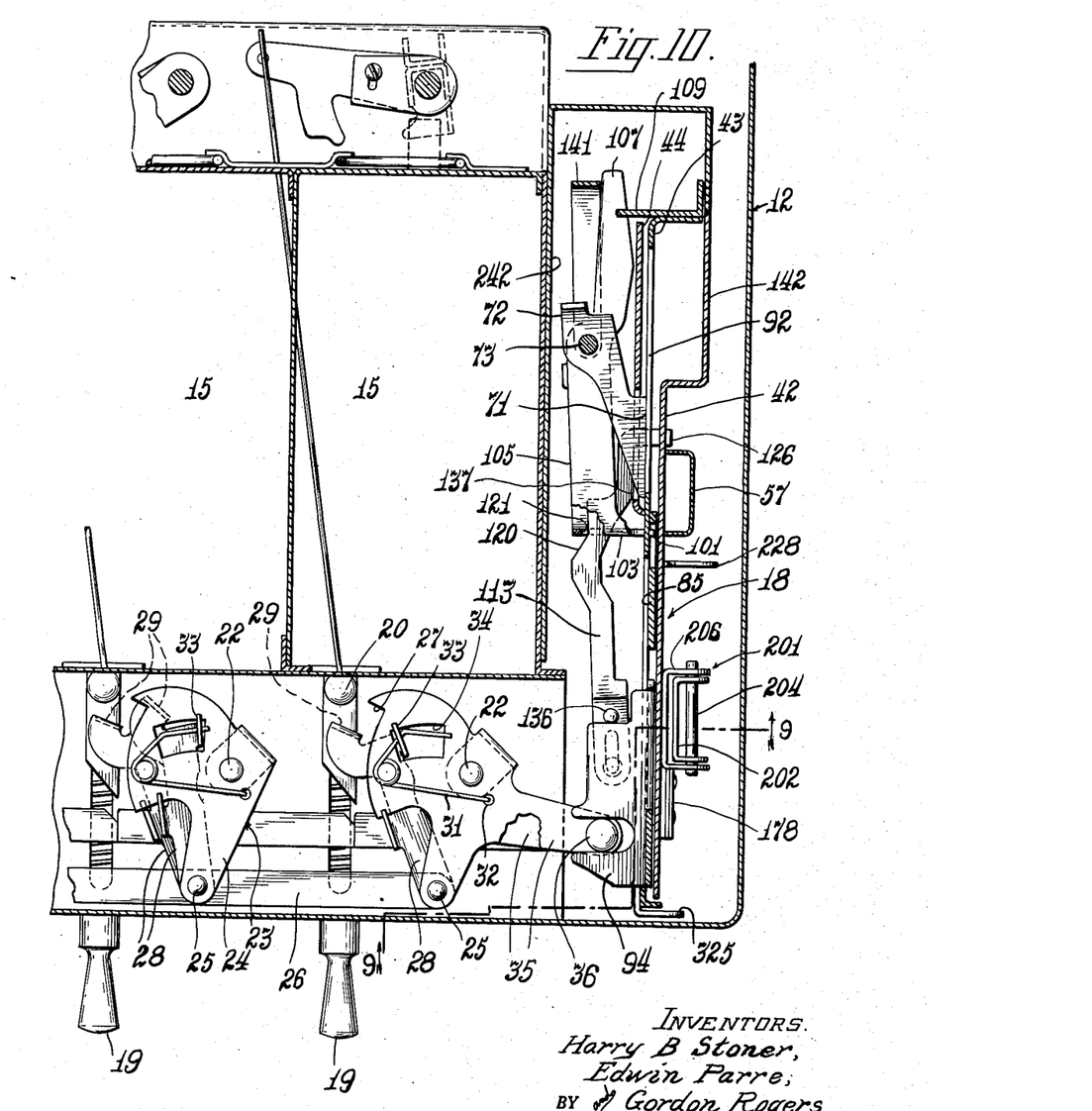
Fig. 10 is a horizontal sectional view through the coin-controlled mechanism and the adjacent end of the vending machine, taken substantially along line 10—10 of Fig. 9.

Referring to the accompanying drawings and particularly to Figs. 1 and 10, the reference character 11 generally indicates a vending machine of the kind in which the present coin-controlled mechanism is incorporated. Vending machines of this character include a cabinet 12 having a window opening 13 through which a plurality of stacks 14 of merchandise may be viewed. The stacks of merchandise are contained within racks, generally indicated at 15, each of which includes a plurality of pivotally mounted shelves or platforms 16 disposed in spaced relation one above the other to provide a plurality of compartments each adapted to contain one piece of merchandise.

Inasmuch as the specific construction of the racks and the manner of mounting the platforms and controlling their selective function to dispense merchandise is fully disclosed and claimed in the aforementioned Stoner Patent No. 2,324,040, the specific details of construction will not be repeated herein. It is sufficient to note at this time that upon manipulation of manually actuable means associated with each rack, one of the platforms or shelves 16 therein is tilted so as to permit the piece of merchandise supported thereby to drop into a dispensing chute for delivery to a receiving tray 17 provided on the front side of the vending machine.

Figure 9:
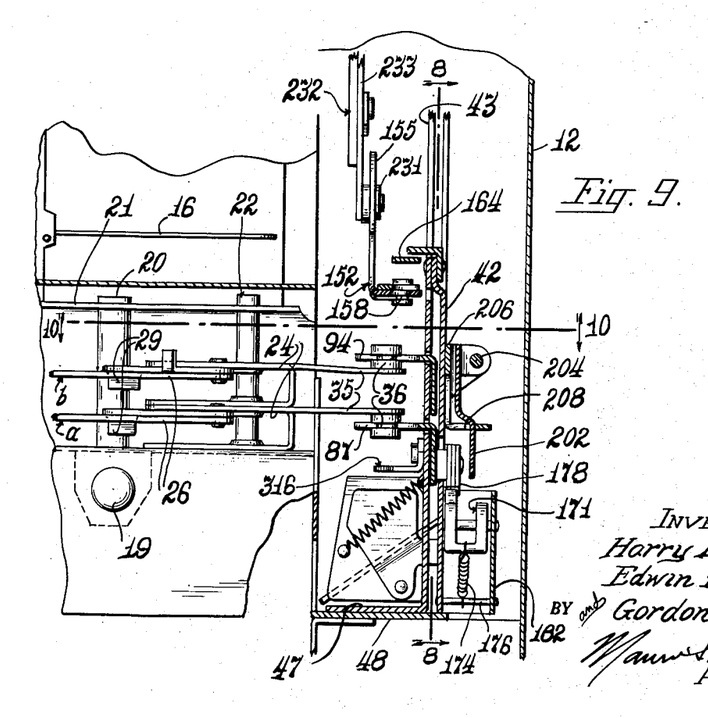
Fig. 9 is a vertical sectional view of the coin-controlled mechanism and showing, in operative association therewith, portions of the actuating crank arm mechanism, taken substantially along the line 9—9 of Fig. 10.

The manually operable actuating mechanism effective to vend a piece of merchandise is generally illustrated in Figs. 9 and 10. This mechanism normally is held against manual operation by means of a coin-controlled mechanism 18 suitably associated therewith and mounted on one side of the bank of merchandise racks 15, which mechanism embodies the features of the present invention and will be described in detail hereinafter.

It is to be noted, however, that the coin-controlled mechanism 18 is of a kind adapted to selectively release and render operable any one of the plurality of manually operable merchandise dispensing mechanisms associated with each of the racks 15. Operation of the merchandise dispensing mechanisms is accomplished by the customer grasping a selected one of the reciprocal plungers 19 extending outwardly of the front face of the vending machine casing 12. The construction and operation of the vending mechanism immediately associated with each plunger 19 is such that it may be adjusted readily to adapt the particular rack associated therewith for containing and dispensing merchandise having a value of five cents or ten cents.

Upon referring to Figs. 9 and 10, it will be observed that each plunger 19 carries a vertically disposed actuating rod 20 which extends upwardly therefrom and is suitably guided in a slot provided in the upper flange 21 of a guide channel arranged on the front side and adjacent the lower ends of the racks 15. Inasmuch as the construction of the operating mechanism associated with each rack is identical, with variations in the mechanical adjustment of certain parts thereof, the following description concerns itself with one such mechanism only.

A journal pin 22 provided closely adjacent to the plunger 19 is firmly secure at its ends in the upper and lower flanges of the channel mentioned hereinabove and it carries a set of crank arms 23, one located above the other and suitably spaced apart. Each crank arm has a forwardly extending ear 24 suitably apertured to receive a pintle pin 25 for pivotally connecting the ends of said ears, one to each of a set of draw bars 26 which extend longitudinally across the front of the guide channel.

In the instant vending machine, the arms 23 in each set are disposed in horizontal rows and a draw bar 26 is connected with all of the crank arms in each horizontal row. The crank arms mounted on any one of the journal pins 22 are adapted to be operated either singly or jointly. Each crank arm 23 has an enlarged portion disposed on one side of the journal pin 22 which includes a shoulder 27 normally disposed closely adjacent to the vertical rod 20 of the related plunger 19. Triggers 28, one associated with each crank arm 23, are each pivotally mounted at one end on the related pintle pin 25, and each has its other end suitably shaped to provide a downwardly extending lug 29 which normally lies in the path of the associated vertical rod 20. Springs 31, anchored at 32 on each crank arm 23, have one end engaged in an ear 33 formed along one edge of the related trigger 28 and extending upwardly through an arcuate slot 34 in the related crank arm 23.

Upon referring to Fig. 9, it will be observed that there are two crank arms 23 and triggers 28 constituting each set of operating mechanisms and, for purposes of description, they are identified herein as $a$ and $b$. As there shown and illustrated in Fig. 10, the lugs 29 on all of the triggers 28 of the lower or $a$ row of crank arms 23 are disposed in the path of the vertical rod 20 so that when the related plunger 19 is pulled outwardly to operate the vending machine, the associated crank arm will be swung about its journal pin 22, thus shifting the draw bar 26 connected therewith longitudinally across the front of the machine.

Each of the crank arms 23 constituting the set of crank arms associated with the merchandise rack at the extreme right hand end of the machine, as viewed in Figs. 9 and 10, has an arm extension 35 carrying a knob or roller 36 which coacts with the coin-controlled mechanism 18. This coin-controlled mechanism is effective normally to prevent actuation of any set or sets of the actuating crank arms 23.

The instant vending machine is intended to vend merchandise having different values. Accordingly, the upper or $b$ set of crank arms 23 are adapted to be selectively adjusted for engagement by the vertical rod 20 when the related plunger 19 is pulled outwardly. Thus, it will be observed, upon reference to Figs. 9 and 10, that the upper crank arm 23 also has its trigger 28 positioned for engagement by the vertical rod 20 when it moves outwardly. Accordingly, outward pulling of the plunger 19, associated with the right hand rack shown in Fig. 10 will cause operation of both crank arms 23 provided, of course, that the coin-controlled mechanism has been conditioned by the insertion of the proper coin. Still referring to Fig. 10, the upper crank arm 23 associated with the second merchandise rack is selectively conditioned so that movement of the plunger 19 associated therewith will impart rotation to the lower crank arm 23 only, provided again, that the coin-controlled mechanism has been conditioned to permit such actuation upon the deposit of a coin or coins of the correct denomination.

The coin-controlled mechanism 18 which embodies the features of the present invention is designed to effect an unlocking of the selected merchandise dispensing mechanism upon the insertion of one or more coins of predetermined denominations, so as to render the dispensing mechanism actuable to vend an article of merchandise of a value corresponding to the number or denomination of coins deposited. In the present instance, the coin-controlled mechanism 18 is constructed to accommodate five-cent and ten-cent coins.

In instances when a five-cent coin is deposited, suitable mechanism contained within the coin-controlled mechanism is conditioned to permit unlocking of the parts in such manner that a plunger 19 effective to rotate both crank arms 23 associated therewith may be manipulated and any attempt to manipulate a plunger 19 operatively associated with but one of its two related crank arms is prevented. Similarly, when a ten-cent coin or two five-cent coins are deposited in the coin-controlled mechanism 18, for the purpose of obtaining a ten-cent piece of merchandise, said mechanism is unlocked to the extent that it will permit operation of a plunger 19 actuable to rotate but one of the two crank arms 23 associated therewith. Should a customer, desiring to obtain a piece of merchandise having a value of five cents, deposit a ten-cent coin in the coin-controlled mechanism 18, said mechanism will be conditioned to permit rotation of both crank arms 23 associated with the selected plunger so as to discharge a five-cent piece of merchandise and, in addition, operate means to release and vend a five-cent piece as change.

Having generally outlined the mode of operation and means effective to obtain selective operation of the various vending mechanisms, the following description will be concerned with the specific details of construction of the coin-controlled mechanism and the change vending mechanism.

Figures 6, 7:
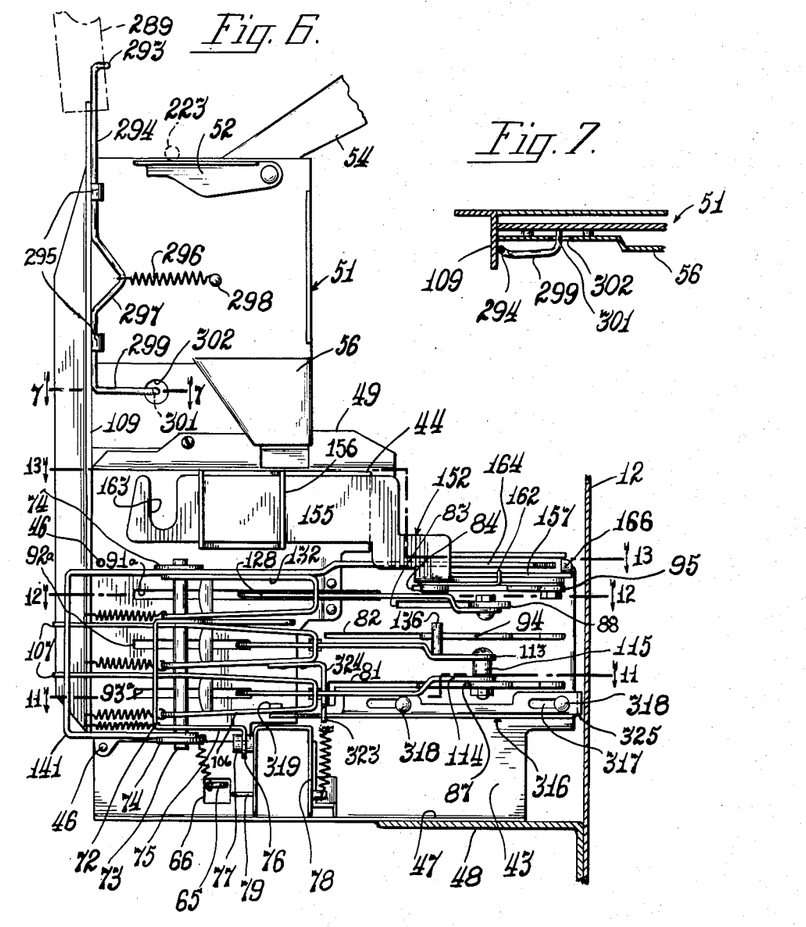
Fig. 6 is an elevational view of the coin-controlled mechanism, viewed from the side opposed to that illustrated in Fig. 2.
Fig. 7 is a sectional detail view taken substantially on line 7—7 of Fig. 6.

The coin-controlled mechanism 18 is best shown as a whole in Figs. 2 and 6. It includes a plate assembly comprising an outside plate 42 (Fig. 2), an inside plate 43 (Fig. 6) and an auxiliary plate 44. These plates are joined together as by means of rivets 45 and 46 respectively which extend through the plates they are intended to secure. Suitable means is provided in the area of said rivets to maintain the plates in spaced relationship with the distance between them being slightly greater than the thickness of the coins for which the mechanism is designed. In the present disclosure, the space between the plates 42 and 43 is of a size to correspond to the thickness of a five-cent coin. The space between the plates 43 and 44 is of a size to correspond substantially to the thickness of a ten-cent coin.

The outside plate 42 and the inside plate 43 are each substantially rectangular in shape, and the plate 43 is provided on its bottom edge with a base flange 47 having suitable openings or other means therein to permit its being firmly secured to a floor plate 48 constituting a part of the vending machine. The upper margin of the inside plate 43 is offset inwardly to define a flange 49 to which is attached a coin mechanism 51.

This coin mechanism 51 is of standard construction and because it forms no part of the present invention, it is not believed to be necessary to describe the same in great detail. It should be noted, however, that said coin mechanism will include the usual magnets (not shown) for detecting fraudulent coins, and a jam-release mechanism including a movable plate and a trigger 52 actuable to release said jam-release mechanism. The specific means provided for actuating said jam-release trigger will be described in detail hereinafter.

It should be sufficient to note at this time that when a coin is deposited in a coin receiving slot 53 provided in the vending machine cabinet, said coin will move downwardly through a trough 54 (Fig. 6) into the coin mechanism 51. Should the coin be of a denomination for which the coin mechanism is not conditioned to receive, said coin will, in a manner customary with such devices, enter into either one of a pair of return chutes 55 and 56 from which it is discharged into a substantially vertical duct 57 (Fig. 2) provided on the outside face of the outside plate 42. The lower end of the duct 57 has an inclined surface 58 which extends through an opening 59 in both plates 42 and 43 so as to direct the coin into a coin return ledge 61 provided on the front of the vending machine cabinet.

Figure 8:
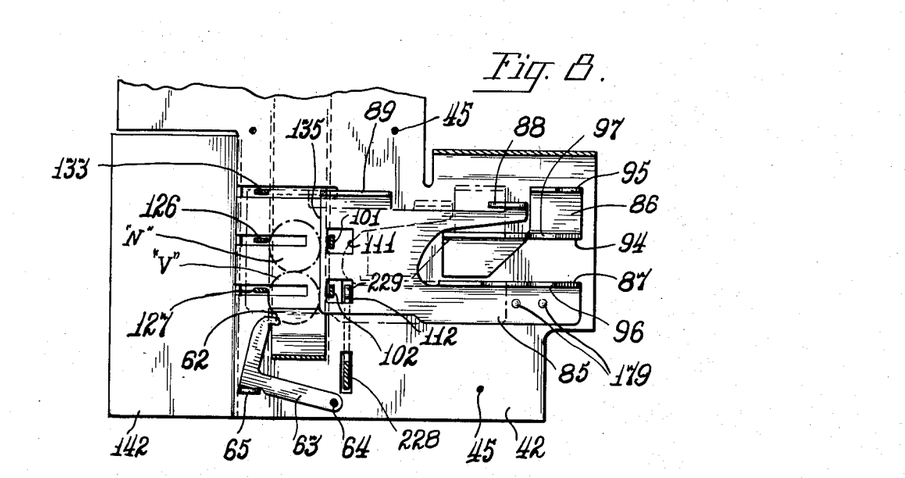
Fig. 8 is a fragmentary vertical sectional view through the coin-controlled mechanism taken substantially on line 8—8 of Fig. 9.

When a coin of the proper denomination is deposited in the coin mechanism 51 it is directed into either of the spaces between the plates 42 and 43 or 43 and 44. In the instance of a five-cent coin being deposited, said coin will enter into the space between the plates 42 and 43 and will come to rest upon a stop finger 62 of a trigger 63 pivoted at 64 between said plates (Fig. 8). The trigger 63 has an ear 65 bent substantially at right angles thereto which projects freely through an opening 66 in the inside plate 43 for a purpose to be described presently. When two five-cent coins are deposited in the coin mechanism 51, both of said coins enter the space between the plates 42 and 43 and the lowermost coin rests upon the trigger end 62, as best shown in Fig. 8, while the second coin rests upon the lower coin.

Inasmuch as the coin-controlled mechanism is adapted to receive ten-cent coins in payment for merchandise of that value, means is provided to retain a ten-cent coin in a selected position within the space between the inside plate 43 and the auxiliary plate 44. Such means is best illustrated in Fig. 10 and is in the form of a blade 71 formed on the end of one arm of a U-shaped bracket 72 (Fig. 6) suitably struck from strap stock and pivotally mounted on a journal pin 73 carried in ears 74 struck out of the auxiliary plate 44. The other arm 75 of the bracket 72 extends beyond its pivotal mounting and has its free end turned downwardly, as at 76, to normally lie in the path of a stud 77 carried on one side wall of an inverted U-shaped pivotally mounted frame 78. Upon referring to Fig. 6, it will be observed that the frame 78 has an ear 79 struck outwardly of one side wall thereof. This ear is located substantially in the area of the trigger ear 65 for a purpose to be described presently.

The inside plate 43 of the coin-controlled mechanism is provided with a plurality of horizontally disposed vertically spaced slots 81, 82, 83 and 84, each to receive for free sliding movement therein a forwardly projecting portion of either one of a pair of slide plates 85 and 86 (Fig. 8). The slide plate 85 is fabricated from a piece of sheet material substantially to the configuration illustrated in Fig. 8. As there shown, it has a flange 87 formed on one of its edges and bent substantially at right angles thereto which flange projects through the slot 81. A second flange 88 formed along another edge of said plate 85 extends through the slot 83. A third flange 89 formed along the edge of said plate having the flange 88 thereon, but adjacent the opposite end thereof, is of sufficient height to project slightly through a horizontally extending slot 91 (Fig. 12) provided in the inside plate 43. Like slots 92 (Fig. 10) and 93 (Fig. 11) also are provided in the inside plate 43. Each of these slots have complemental registering slots 91a, 92a and 93a, provided in the auxiliary plate 44.

The other slide plate 86 likewise is provided with flanges bent at right angles thereto, one of which, as at 94, extends through the slot 82, while the other flange 95 extends through the slot 84. The pair of flanges 87 and 94 are provided with notched recesses 96 and 97 each of which is adapted to receive, in detachable engagement therewith, one of the rollers 36 on the free end of each crank arm 35. Upon referring to Figs. 9 and 10, it is evident that when either one or both of the crank arms constituting a set of crank arms journaled on the vertical pins 22, is rotated about its journal, the corresponding slide plate or plates will be shifted in a horizontal plane substantially from the position illustrated in Fig. 8 in full lines into the position there illustrated in dotted lines.

Sliding movement of said slide plates normally is prevented in the absence of the proper coin or coins having been inserted in the coin-controlled mechanism. Means to prevent such sliding is provided in the form of stop lugs 101 and 102 (Fig. 8) one extending from an edge of each intermediate wall or bight portion 103 and 104 of a pair of substantially U-shaped locking members 105 and 106. The locking members are fashioned from sheet stock and they have their substantially parallel legs pivotally mounted adjacent their free ends upon the vertically disposed journal pin 73. Each of these U-shaped locking members has a leg extension of 107 projecting beyond the journal pin 73. Springs 108, one connected at one end to each of the other side wall portions and at their other ends to a flange 109 on the coin-controlled mechanism, normally hold the U-shaped locking members firmly against the face of the inside plate 43 so as to hold their respective lugs 101 and 102 projected into the space between the plates 42 and 43.

Obviously when the stop lugs 101 and 102 are located in the path of the slide plate 85, said slide plate cannot be shifted out of the position substantially as shown in full lines in Fig. 8. Such limited movement as is permitted of the slide plate 85 while the lugs are so positioned is obtained by reason of the clearance between said lugs 101 and 102 and shoulders 111 and 112 on said slide plate.

Sliding movement of one or both slide plates 85 and 86 is necessary to permit actuation of the vending operating mechanism described hereinabove, because each slide plate is operatively connected with the actuating mechanism through the rollers 36 on the crank arm extensions 35. Accordingly, means is provided on both slide plates movable therewith to rock the U-shaped locking members 105 and 106 into unlocking position. The means provided on the slide plate 85 consists of a pair of cam arms 113 and 114, both of which are slideably connected to the projecting flange 87 on slide plate 85 as by means of a vertical stud or screw 115. The stud 115 extends freely through a slot 116 in the cam arm 113 and a slot 117 in the cam arm 114.

Because of the slotted connection between the cam arms 113 and 114 and the slide plate 85, limited sliding movement of the slide plate may be accomplished without longitudinal shifting of the cam arms 113 and 114. Such limited or initial sliding movement is, as noted hereinabove, limited by abutment of the slide plate edges 111 and 112 with the stop lugs 101 and 102. Means is therefore provided on the cam arms 113 and 114, effective when said arms are shifted a sufficient distance longitudinally, to lift the U-shaped locking members 103 and 104 so as to carry their stop lugs 101 and 102 out of the path of the edges 111 and 112 to thereby permit the slide plate 85 to be shifted longitudinally through a complete cycle of operation.

As best shown in Fig. 10 the cam arm 113 is provided with an offset cam edge 120 normally closely adjacent to the end wall of the U-shaped locking member 105. Said locking member end wall is suitably slotted, as at 121, to receive the free end of the cam arm 113 therethrough. It should be apparent that when said arm is shifted longitudinally its cam surface 120 coacts with an edge of the slot 121 to thereby rock the locking member outwardly away from the inner plate 43. Similarly, the cam arm 114 is provided with a cam surface 122 (Fig. 11) adapted to coact with the edge of a slot 123, in locking member 104, through which said cam lever extends. When the cam arm 114 is shifted longitudinally during operation, the U-shaped member 106 is rocked about its pivot 73 sufficiently to carry its stop lug 102 thereon out of the path of the slide plate 85.

The specific mode and manner of operation and function of the slide plate 85, and of the related cam arms 113 and 114 carried thereby, will be more specifically referred to hereinafter. It is sufficient to note at this time, however, that the free ends of each of the cam arms 113 and 114 are provided with fingers 126 and 127 respectively, which fingers project through the related slots 92—92a and 93—93a respectively, in the plate assembly.

The projecting flange 88 on the slide plate 85 also carries a cam arm 128 (Fig. 12) suitably formed with a cam edge 129 adapted, under certain conditions of operation, to coact with the end of a slot 131 provided in the end wall or bight portion of a U-shaped member 132 pivotally mounted about the journal pin 73. The arm 128 also has a projecting finger 133 which extends freely through the registering slots 91—91a in the plate assembly.

The operation of the mechanism insofar as it has been described hereinabove is substantially as follows:

Assuming the customer desires to purchase merchandise valued at five cents, a five-cent coin V is deposited in the coin receiving slot 53 and subsequently comes to rest on the stop finger 62 (Fig. 8) in such position as to lie in the space between the forward edge 135 of the slide plate 85 and the projecting finger 127 of cam arm 114. The operator then grasps a plunger 19 associated with the rack containing the merchandise selected. The plunger 19 is then pulled outwardly. This causes both crank arms 23 of the related set of crank arms to rotate about their pintle pin 22, so as to impart sliding movement to both slide plates 85 and 86. The presence of a coin V in the area between the slide plate and the cam finger serves to maintain the cam arm substantially in the position best illustrated in Fig. 11. Accordingly, the cam surface 122 on said arm 114 will coact with the slot 123 to rock the U-shaped locking member 106 outwardly and thereby carry the stop lug 102 out of the path of the slide member 85.

Advance of the slide member 85 past the withdrawn stop lug 102 would normally be prevented by the presence of the stop lug 101 on the U- shaped locking member 105. This second locking of the slide plate 85 must necessarily be eliminated. It is for this reason that the vending of merchandise valued at five cents requires the sliding of the slide plate 86 in addition to the slide plate 85. Upon referring to Figs. 6 and 10, it will be observed that the cam arm 113 has an upstanding pin 136 which projects into the path of the flange 94 on slide plate 86. Consequently, joint movement of both slide plates imparts positive forward advance of the cam arm 113, notwithstanding its slotted connection with the slide plate 85. This positive forward advance of the cam arm 113, during the interval while the slide plate 85 is advancing to take up the slack resulting from its slotted connection with cam arm 114, permits the cam surface 120 of the cam arm 113 to engage and coact with the end of the slot 121 in the U-shaped locking member 105 to thereby rock the same and carry its stop lug 101 out of the path of the slide member 85. Such coaction of the cam surface 120 with the locking member 105 is occasioned by the fact that the cam arm 113 is formed with a flat surface 137 which initially rides upon the surface of auxiliary plate 44 with the result that its free end does not fall into the registering slots 92—92a while its cam surface 120 is passing through the slot 121.

During the dispensing of a five-cent piece of merchandise, the cam arm 128 also is carried through the slot 131 in its related locking member 132. However, said cam arm does not impede sliding movement of the slide plates and does not rock the locking member 132. This results from the absence of a coin in the path of the cam arm 128 which allows said arm to move into the slots 91—91a while its cam surface 129 passes through the slot 131. Upon referring to Fig. 12, it will be observed that as the slide plate 85 advances, the edge 138 of its flange 89 is engaged by a shoulder 139 on one edge of the cam arm 128 to thereby limit movement of the cam arm into the registering slots 91—91a. Consequently, the cam surface 129 on said arm 128 rides beneath the end of the slot 131 without imparting any rocking movement to the U-shaped member 132.

The purchase of a ten-cent piece of merchandise may be effected by depositing two five-cent coins in the coin-controlled mechanism. Under such circumstances, both coins V and N will rest substantially in the positions shown in Fig. 3. The presence of a five-cent coin V in the lowermost position illustrated will act upon the associated cam arm 114 and locking member 106 in the manner described hereinabove.

The presence of the second coin N in the space between the forward edge 135 of the slide plate 85 and the cam arm finger 125 will hold said arm in the position substantially as illustrated in Fig. 10 to thereby prevent said arm from dropping into registering slots 92—92a when it is advanced. Accordingly, when the operator pulls a plunger corresponding to a stack of merchandise of the value of ten cents only the bottom one of the two crank arms 23 of the related set of crank arms is actuated. Actuation of the lower crank arm (a) in said set of crank arms imparts sliding movement to the slide plate 85 only. The slide plate 86 remains stationary.

Initial sliding of the slide plate 85 is effective to take up the slack resulting from the slotted connection between said slide plate and the cam arms 113 and 114. Because both of said arms are now held in what might be termed an effective position, owing to the presence of a coin beneath each of said arms, the cam surfaces 120 and 122 respectively, of said arms are effective to rock both U-shaped locking members 105 and 106 sufficiently to withdraw the stop lugs 101 and 102 out of the path of the slide plate 85. The slide plate 85 may now be advanced the entire distance required to effect vending of the merchandise selected.

Figures 11, 12:
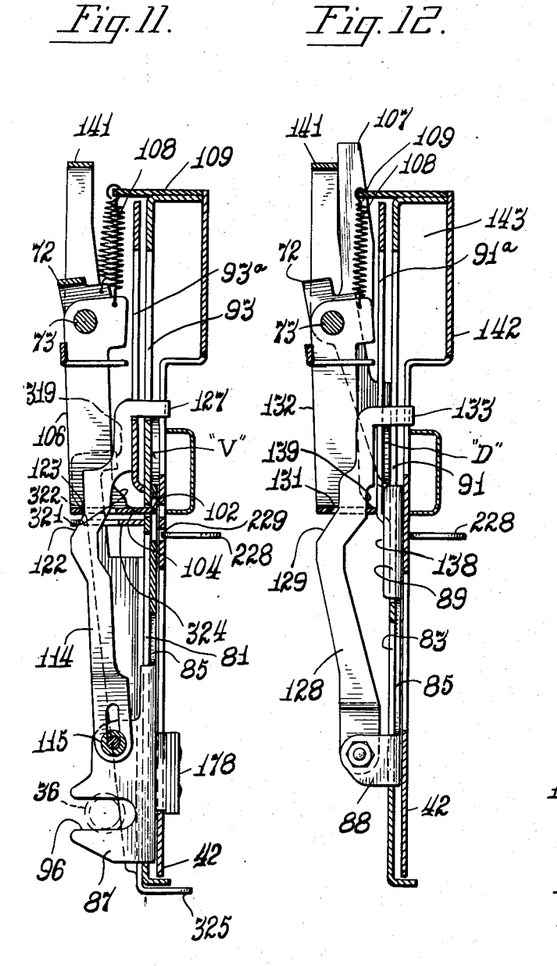
Fig. 11 is a horizontal sectional view taken substantially on line 11—11 of Fig. 6.
Fig. 12 is a horizontal sectional view taken substantially on line 12—12 of Fig. 6.

The coin-controlled mechanism is adapted also to permit the vending of merchandise having a value of ten cents upon the deposit of a ten-cent coin. In such instance, the ten-cent coin D comes to rest in the space between the inside plate 43 and the auxiliary plate 44 and on the blade 71 formed on the end of the bracket 72 journaled on pin 73. This structure is best illustrated in Figs. 10 and 12. When a ten-cent coin is held in the manner aforesaid, it is located between the forward edge of the flange 89 on slide plate 85 and the projecting finger 133 of the cam arm 128 (Fig. 12). Only the slide plate 85 must be advanced in order to unlock the vending mechanism much in the same manner as when two five-cent coins were deposited. In this instance, however, the ten-cent coin holds the cam arm 128 in a position to cause its cam edge 129 to coact with the end of the slot 131 in the locking member 132 when the slide plates are advanced. This engagment rocks the locking member 132 about its pivot 73.

It should be noted that the locking member 132 does not have a stop lug of the kind carried by the other locking members 105 and 106. The locking member 132 is provided with a bail-shaped extension 141 which has its intermediate portion bridging and resting against the rearwardly extending legs 107 formed integral with the locking members 105 and 106. As a result of this mechanical association between the three locking members, rocking of the locking member 132 rocks the locking members 105 and 106 to thereby withdraw their locking lugs 101 and 102 out of the path of the slide 85. Consequently, the slide 85 may be shifted through its entire stroke to permit the vending of the piece of merchandise of the value of ten cents.

In each instance, operation of the coin-controlled mechanism described hereinabove, either by the deposit of one or two five-cent coins or of a ten-cent coin, is effective to deposit said coin or coins in a coin receptacle contained within the vending machine. This acceptance and deposit of the coins is accomplished by providing an outwardly offset portion 142 in the outer plate 42. Such offsetting of the portion 142 provides a relatively wide vertically disposed coin-receiving chamber 143 into which the coins carried forward by the advancement of the slide plate 85 are deposited. Coins entering said chamber fall through the open bottom thereof into a coin receptacle provided within the vending machine.

Figure 13:
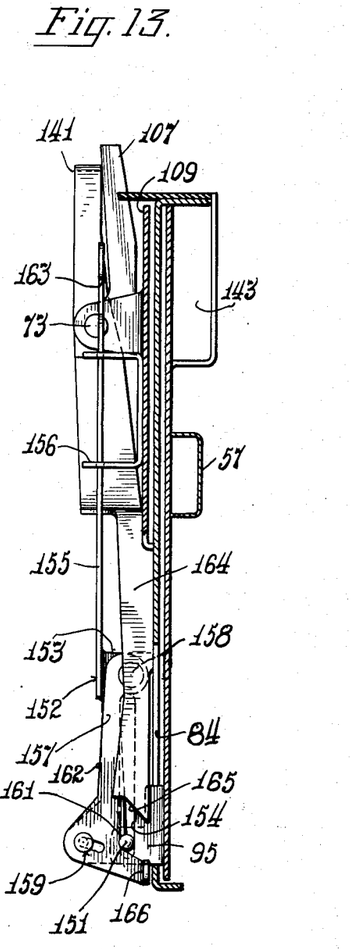
Fig. 13 is a horizontal sectional view taken substantially on line 13—13 of Fig. 6, showing the mechanism in neutral position.
Figure 15:
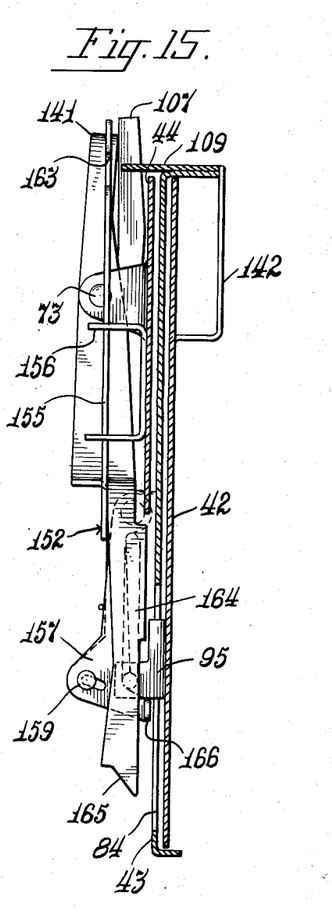
Fig. 15 is a horizontal sectional view like Fig. 14 but showing the parts in the positions assumed when a change coin is vended to the customer.

Vending of merchandise having a five cent value, upon the deposit in the coin-controlled mechanism of a ten-cent coin, is readily accomplished by the instant structure which is associated with means to return a five-cent coin to the customer, as change. To this end, the suitable change coin discharge mechanism, provided in the vending machine, is operatively associated with the slide 86. As best shown in Figs. 6, 13 and 15, the projecting flange 95 on the slide plate 86 is apertured to receive a pin 151 firmly secured therein. A bracket, generally indicated at 152, includes a flange 153 which is disposed in a horizontal plane and is suitably slotted, as at 154, to receive the pin 151 therethrough. The bracket 152 also includes a substantially vertically disposed horizontally elongated plate-like portion 155 which is disposed wholly above the horizontal flange 153 and is guided for longitudinal sliding in a U-shaped bracket 156 mounted on the face of the auxiliary plate 44.

In order to operate the change delivery mechanism to be described presently, the bracket 152 must be slid longitudinally as an integral part of the slide plate 86.

During machine operation involving longitudinal shifting of the plate 86, in instances where no change need be returned to the operator, the pin 151 is conditioned, in a manner to be described presently, so as to slide freely in the slot 154 without imparting any sliding movement to the bracket 152.

Such releasable locking together of the slide plate 86 and bracket 152 as is required for the different modes of operation is best effected by providing a latch 157 on the upper face of the horizontal bracket portion 153. The latch 157 is pivotally secured at one end to said horizontal portion, as at 158, and its free end is held against unlimited displacement by a pin and slot connection 159. Normally, a shoulder 161 provided on one edge of the latch 157 is held in engagement with the pin 151 by a tension spring 162 associated therewith. Obviously, longitudinal shifting of the slide member 86 while the latch 157 remains engaged with the pin 151 will cause said bracket 152 to be carried longitudinally as an integral part thereof.

The free or projecting end of the vertically disposed bracket portion 155 is provided with a notch or recess 163 which affords means for operatively conecting the bracket 152 with the change return mechanism. This mechanism will be described in detail hereinafter.

In order to effect disengagement between the bracket 152 and the slide member 86 under conditions of operation not requiring the return of a coin, means is actuated to disengage the latch 157 from the pin 151. To this end, the locking member 132 is provided with a forwardly extending arm 164 which normally has one of its edges resting firmly against the inside wall 43. The free end of the arm extension 164 is located substantially in the area of the pin 151 when the slide member 86 is in its retracted position shown in Fig. 13 and said free end is provided with a cam surface 165.

Figure 14:
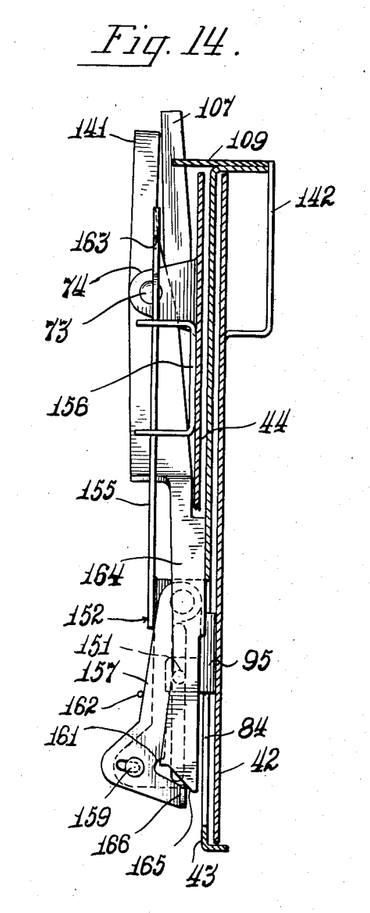
Fig. 14 is a horizontal sectional view substantially like Fig. 13, but showing the mechanism in positions assumed under operation when no change coins are to be discharged.

When two five-cent coins or a ten-cent coin is inserted in the coin-controlled mechanism for the purpose of obtaining a ten-cent piece of merchandise, only the slide plate 85 is advanced while the slide plate 86 remains stationary. When both slide plates are shifted during the purchase of a five-cent piece of merchandise upon the insertion of a five-cent coin, the cam surface 165 is adapted to coact with a lug 166 on the free end of the latch 157 during initial advancement of the latch and its component parts. When the latch lug 166 contacts the cam surface 165 the latch, during initial advance of the slide plate 86, is rocked about its pivot 158 in the manner best shown in Fig. 14 to thereby disengage its shoulder 161 from the pin 151. Consequently, the slide plate 86 is free to advance the entire distance of its sliding movement without carrying the bracket 152 therewith.

When a ten-cent coin is deposited in the coin-controlled mechanism for the purchase of a five-cent piece of merchandise, the cam arm 128 rocks the locking member 132 thus lifting the arm extension 164 sufficiently to permit the latch lug 166 to pass freely therebeneath without disengaging the latch 157 from pin 151. As a result, the bracket 152 moves with the slide plate 86 so as to actuate the change making mechanism to be presently described.

Means is provided in the instant coin-controlled mechanism to prevent a return movement of the sliding plates prior to the completion of an operating stroke. Such means prevents fraudulent manipulation of the device. This is accomplished by providing a pawl 171 on the coin-controlled mechanism, as best shown in Figs. 2 and 9. The pawl 171 is mounted for free rotation on pin 172 and is held normally with its engaging portion 173 substantially vertical by two tension springs 174 which are connected one to each of a pair of legs 175 on the pawl 171. Pins 176 projecting outwardly from the outside plate 42 provide means for securing the other ends of the springs in place. In the construction illustrated, the outside plate 42 has a horizontal slot 177 through which a block 178 extends. The block 178 is firmly secured to the back face of slide plate 85, as by means of rivets 179, and its lower edge is serrated to provide teeth 181 disposed in a plane to cooperate with the engaging portion 173 on the pawl 171 when the slide plate 85 is moved during machine operation.

During operation, as the said slide plate 85 is moved to the right, as viewed in Fig. 2, the serrated edge 181 will engage the engaging portion 173 and rock the pawl in a clockwise direction, in which position the slide plate 85 can continue moving to the right. If this movement is stopped while the engaging portion 173 is still in engagement with the teeth 181, the motion cannot be reversed to the left. However, when the stroke of the slide plate 85 has been completed to such an extent that the block 178 is carried past the pawl 171, the pawl will again assume its normal substantially vertical position. When the stroke is then reversed, the pawl 171 will again be effective to prevent anything but a completed return stroke for the slide plate 85. If desired, a cover plate or shield 182 may be disposed over the pawl 171 to prevent access being gained thereto to render it inoperative.

Experience has established that fraudulent operation of coin-controlled mechanisms and subsequent vending of merchandise without the deposit of a coin may be obtained under certain conditions of misuse. One such condition arises when one side of the vending machine is struck a series of sharp blows of sufficient intensity and regularity as to impart inertia to the locking members 105, 106 and 132. When this occurs, the locking members may be momentarily rocked about their pivots sufficiently to permit initial manipulation and sliding of either or both of the slide plates 85 and 86. Once such initial sliding is obtained to a degree sufficient to carry the edges 111 and 112 of the slide plate 85 past the area normally occupied by the stop lugs 101 or 102, the stroke can be completed and merchandise vended. Means is provided to prevent manipulation of the slide plate 85 under such conditions as have been described immediately hereinabove.

Referring to Figs. 2 and 9 an inertia lock, generally indicated at 201, is mounted upon the outside face of the outer plate 42. This lock consists of a substantially flat plate 202 provided with parallel ears 203 adjacent its upper end suitably apertured to receive therethrough a hinge pin 204 journaled at its ends in ears 205 projecting outwardly from a mounting plate 206 firmly secured, as by welding, to the face of plate 42. The mounting plate 206 has its lower portion bent outwardly substantially at right angles thereto, as at 207, and suitably slotted at 208 to permit the plate 202 to depend freely therethrough.

Under normal conditions of operation, the inertia lock plate 202 is suspended in substantially the vertical position illustrated in Fig. 9. However, when the vending machine is struck severe blows in a lateral direction of sufficient intensity and regularity to cause the locking members 105, 106 and 132 to move into unlocking position momentarily, the inertia lock plate 202 likewise will rock in the same direction as the locking members. Such inward movement of the inertia lock plate 202 disposes its lowermost end portion in the path of the serrated block 178. As a result, any attempt to move the slide plate 85 during such momentary disengagement of the locking members 105, 106 and 132 is prevented. It is to be understood that the inertia lock is suitably balanced as to remain substantially vertical under normal conditions of operation.

Figures 3, 4, 5:
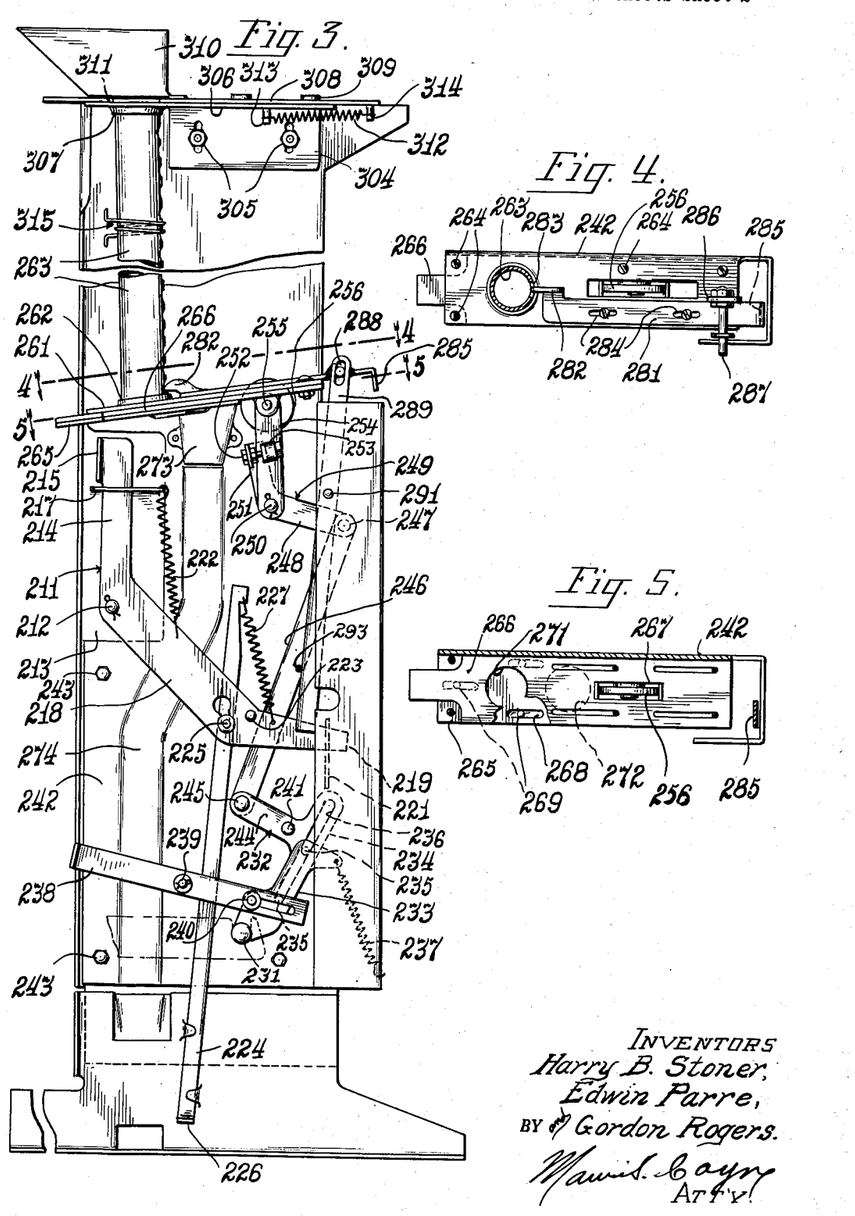
Fig. 3 is an end elevational view of the merchandise racks showing the change-making and coin return mechanisms and illustrating (in broken lines) an associated portion of the coin-controlled mechanism attached thereto.
Fig. 4 is a horizontal sectional view taken substantially on line 4—4 of Fig. 3.
Fig. 5 is a horizontal sectional view taken substantially on line 5—5 of Fig. 3.

Should a customer desire to have any coin or coins deposited in the coin slot returned to him without operating the machine and obtaining the merchandise originally selected, he may actuate suitable means to permit said coin or coins to be discharged therefrom. Such means is best shown in Figs. 3 and 6 and it includes a bell-crank lever 211 which is fashioned from sheet stock and is pivotally mounted at 212 on a bracket 213 also fashioned from sheet stock firmly secured, as by welding, to the outside face of the end wall of the right hand rack located adjacent to the coin-controlled mechanism. The bell-crank lever 211 has an arm portion 214 which extends upwardly from the pivot 212 and is provided on its free end with an angularly disposed finger engaging portion 215. This finger engaging portion 215 is located to the rear of an opening 216 in the front wall of the vending machine housing 12 or is otherwise so disposed as to be readily accessible for engagement by the customer. The bracket 213 has its upper margin bent out of the plane thereof substantially horizontally to provide a flange 217 suitably slotted to admit the bell-crank arm 214 therethrough and to limit rocking motion of said bell-crank.

The other arm 218 of said bell-crank lever 211 extends rearwardly and downwardly from the pivot 212 and then horizontally to dispose its free end 219 through a slot in a vertical flange 221 suitably secured to the end wall of the rack. A spring 222 having one end connected to the arm 218 and its other end anchored in the bracket flange 217 normally retains the bell-crank lever in the position of rest illustrated in Fig. 3. It should be obvious that when the finger engaging portion 215 of the bell-crank lever 211 is pushed inwardly, the bell-crank lever is rotated about its pivot 212 in a clockwise direction against the tension of spring 222.

A pin 223 extending outwardly from one face of the arm 218 of the bell-crank lever is disposed immediately above the jam-release trigger 52 (Fig. 6) so that when the bell-crank lever 211 is rotated in a clockwise direction, the pin 223 will cause the jam release trigger to be moved about its pivot to actuate suitable means provided in the coin-mechanism 51 so as to release any jammed coin or coins having a thickness greater than the thickness of the coin the mechanism is adapted to receive. Such coins as are released upon movement of the jam-release trigger 52 fall into the coin return chute 55—56 and are returned to the customer.

Movement of the bell-crank lever 211 acts also to depress a bar 224, loosely connected thereto as by means of a rivet 225, which extends vertically between the end wall of the end rack and the coin-controlled mechanism and has its lower end bent substantially at right angles thereto to define a foot portion 226 that overlies both of the lugs 65 and 79 (Fig. 6). A spring 227 retains the bar 224 in actuable position with relation to the bell-crank lever 211 but when said bell-crank lever is rotated to actuate the jam-release trigger, the bar 224 is carried downwardly thereby so that its foot portion 226 engages the lugs 65 and 79 to rock the coin support trigger 63 and the U-shaped frame 78. Rocking of the U-shaped frame 78 imparts rocking motion to the U-shaped bracket 72 sufficiently to withdraw the coin supporting blade 71 out of the path of any coins lying in the space between auxiliary plate 44 and inside plate 43 of the plate assembly. Such coins as are released upon withdrawal of the coin supporting blade 71 and the rocking of trigger end 62 drop onto the inclined surface of the coin return chute 57 and are likewise returned to the customer.

When the coin return mechanisms are actuated, an arm 228 carried by the U-shaped frame 78 and extending rearwardly therefrom and then upwardly, as best shown in Fig. 8, is moved to carry its forwardly projecting end portion 229 into the path of the slide plate edge 112 to prevent advancement of the slide plate and operation of the vending mechanism.

Reference has been made hereinabove to operation of means to effect the discharge of a change coin when a ten-cent coin is deposited in the coin-controlled mechanism for the purpose of obtaining merchandise having a value of five cents. Such change coin vending means provided in the present vending machine is operatively associated with the longitudinally reciprocal bracket 152. Upon reference to Fig. 3, it will be observed that the bracket plate 155 is fragmentarily illustrated in broken lines. As shown, the free end of the plate is provided with a relatively deep recess 163 which is engaged at all times by a roller 231 carried on the lower end of an adjustable bell-crank lever 232. The portion 233 of said bell-crank lever 232 carries the roller 231 and is slideably connected to an arm 234 of said bell-crank lever as by means of pins 235 and slot 236. A spring 237 normally holds the slideable member 233 in the lowermost position of adjustment illustrated. When a manually engageable lever 238, pivoted at 239 and connected at 240 to the slide portion 233, is rocked, the portion 233 is raised to elevate the roller 231. This permits engagement of the roller in the recess 163 during mounting of the coin-controlled mechanism on the vending machine and also returns the mechanism to its initial position after each actuation.

The bell-crank lever 232 is pivotally secured on a pivot 241 projecting outwardly from a mounting plate 242 affixedly secured, as by means of bolts and nuts 243, to the end wall of the rack adjacent to the coin-controlled mechanism. The other arm 244 of said bell-crank lever 232 is pivotally connected at 245 to one end of a link 246 which extends upwardly angularly therefrom and has its upper end pivotally secured, at 247, to the end of one arm 248 of a second bell-crank lever generally indicated at 249. The bell-crank lever 249 is pivotally mounted upon a pin 250 projecting outwardly from the plate 242 and its other arm 251 carries an adjusting screw 252 adapted to cooperate with a bearing block 253 projecting from one face of a link 254 pivotally mounted at one end on the pin 250. The other end of said link 254 is suitably apertured to receive therethrough a journal 255 for mounting a roller 256 thereon. The adjustable mounting of the link 254 relative to the bell-crank 249 is provided to facilitate accurate co-ordination of the coin-controlled mechanism with change vending mechanism to be described presently and which is actuated through operation of the bell crank 249.

Still referring to Fig. 3 of the accompanying drawings, the upper margin of the mounting plate 242 is bent substantially at right angles to provide an inclined horizontal flange 261. This flange is provided with a circular flanged opening 262 of such size as to receive snugly therein a tube 263 adapted to contain a stack of five-cent pieces. A plurality of bolts 264 having suitable spacers thereon afford means for securing a bottom plate 265 on the bottom face of the flange 261 but in spaced relationship thereto. A reciprocal gate plate 266, best shown in Fig. 5, is slideably mounted between the flange 261 and underlying plate 265. This gate plate 266 is provided with a slotted aperture 267 of sufficient size to receive relatively freely the roller 256 on the upper end of the link 254. Means is provided, preferably in the form of elongated depressions 268 and associated anti-friction balls 269 located between the gate plate 266 and underlying plate 265 to minimize frictional resistance to sliding of the gate plate.

The gate plate 266 also is provided with a circular opening 271 which normally underlies the tube receiving opening 262 in the flange 261. A similar opening 272 is provided in the underlying plate 265 but is offset to the right, as viewed in Figs. 3 and 5. The opening 272 communicates with an inclined chute 273 located therebeneath and firmly secured to the plate 242. The lower end of the chute is in direct communication with a coin passageway 274 formed in the mounting plate 242 as by offsetting a portion thereof throughout substantially its entire length.

It should be apparent at this time that when the slide bracket 152 is shifted longitudinally during the operation of the coin-controlled mechanism following the deposit of a ten-cent coin for a five-cent piece of merchandise, the bellcrank 232 is rocked about its pivot 241 to thereby pull the link 246 downwardly and rock the bellcrank 249 in a clockwise direction so as to move the gate plate 266 from a position where its coin receiving opening 271 aligns with the tube opening 262 into position where said opening 271 registers with the opening 272 to thereby deposit a single coin, in this instance, a five-cent piece, into the chute 273 for discharge through the passageway 274 and deliver it to the customer through a suitable opening in front of the vending machine.

Means is provided in the vending machine to prevent the acceptance of a ten-cent coin, should the coin tube 263 be empty. Such means is best shown in Figs. 3, 4, 6 and 7. Upon referring to Figs. 3 and 4, it will be noted that the horizontal flange 261 has slideable thereover a strap 281 formed with an upstanding finger 282 on the end disposed closely adjacent to the tube 263. This finger is provided with a relatively sharp point on its free end adapted to extend through an opening 283 in the tube wall a short distance above the flange 261. The strap 281 is mounted for longitudinal shifting on the flange 261, as by means of the screw and slot connections 284, and its rearwardly disposed end is turned downwardly as at 285 for a purpose to be explained hereinafter.

An ear 286 is folded upwardly along one edge of the strap 281 inwardly of the rear end thereof which ear carries a lateral pin 287 that extends through a slot 288 in the upper end of a rock arm 289 pivotally secured at 291 to the flange 292 of the assembly mounting plate 242. The lower end of the arm 289 terminates a considerable distance below its pivotal mounting at 291 and is adapted to cooperate with a trigger 293 (Fig. 6) mounted on and operatively associated with the coin mechanism 51. Upon referring to the Fig. 6 disclosure, it will be noted that the trigger 293 is formed on the upper end of a rod 294 journaled at 295 on the flange 109 of said mechanism. A spring 296, connected at one end to an offset portion 297 of the rod 294 and at its other end to a pin 298 carried by the coin mechanism, normally holds the trigger firmly in contact with the rock arm 289 at all times.

The lower end of the trigger-rod 294 is bent substantially at right angles thereto to provide a lateral extension 299 having an inturned end portion 301 adapted to enter through a hole 302 in one of the side walls 303 of the coin mechanism 51 so as to be disposed in the path of a ten-cent coin passing through said mechanism.

When the coin tube 263 contains a supply of five-cent coins, the strap 281 is held in a rearwardly adjusted position to thereby hold the lower end of the rock arm 289 in position to hold the trigger 293 turned against the action of spring 296, to hold the inturned end portion 301 out of the coin passageway. As a result, ten-cent coins deposited in the coin mechanism 51 will move through their normal path of travel and be received and deposited in a position to permit actuation of the coin-controlled mechanism in a manner described hereinbefore. However, should the tube 263 be empty of five-cent coins to be returned as change upon the deposit of a ten-cent coin, the pointed end of strap finger 282 enters the tube 263 to thereby move the rock arm 289 away from the trigger and thus allow the end portion 301 to enter the coin path. As a result any ten-cent coin deposited in the coin mechanism is diverted by the end portion 301 and directed into the coin return passageway for return to the customer.

The construction of the change coin discharge mechanism and coin reject mechanism described hereinabove is such that each time the change coin discharge mechanism is actuated, the slide strap 281 of the coin reject mechanism is shifted in a direction to momentarily relieve the lowermost coin or coins in the stack within the tube 263 of any pressure so that said coins may move downwardly in said tube as successive coins are withdrawn therefrom. This joint operation of the two individual mechanisms is effected by the provision of the downturned end portion 285 on the strap 281. Upon referring to Fig. 5, it will be observed that the downturned portion 285 lies in the path of the gate plate 266 so that when the latter is shifted to the right, as viewed in Fig. 5, its leading edge strikes the end portion 285 and carries the strap 281 therewith a short distance so as to momentarily move the finger 282 away from the stack of coins.

The uppermost end of the change coin tube 263 is provided with means to prevent fraudulent spilling of coins through the upper end thereof under conditions when the vending apparatus is inverted. Accordingly, a flanged bracket 304 is firmly secured adjustably, as by bolts 305 to the end wall of the right hand rack, which bracket includes a horizontal flange 306 suitably apertured at 307 to receive snugly therein the upper end of the change tube 263. A slide plate 308 is mounted for horizontal reciprocation on the horizontal flange 306 as by means of flanged pins 309. This slide plate carries a hopper-shaped receptacle 310 which communicates with an opening 311 in the slide plate. The opening normally is held in register with the open upper end of the tube 263 due to the action of a spring 312, connected at one end to a pin 313 on the flange 306 and at its other end to a pin by the slide plate 308. This construction is such that the opening 311 is in register with the upper end of the tube 263 when the front wall of the cabinet is moved away for the purpose of inserting a supply of coins. When the cabinet is replaced it abuts the front end of the hopper and urges it and the slide plate 308 rearwardly against the action of spring 312 to block the tube opening. An adjustable guage 315 is slidable on the tube 263 to enable the service man to maintain a check on the number of coins placed in the tube when the apparatus was last serviced.

During the servicing of machines of the character disclosed herein, it frequently happens that the merchandise contained in one or more of the racks 15 is removed and merchandise of another kind or value is substituted therefor. Should the rack to be emptied be substantially filled, considerable time would be involved in separately removing each piece of merchandise contained therein.

Accordingly, means is provided whereby the coin-controlled mechanism may be conditioned to permit operation of all of the plungers associated with all of said racks without the insertion of any coins. When the coin-controlled mechanism is thus conditioned, the plungers 19 may be repeatedly pulled to successively discharge the contents of the racks in a very short time. Upon referring to Fig. 6, it will be observed that the inside plate 43 of the coin-controlled mechanism has slideable upon its exposed face a cam element 316. This element comprises a flanged bar having one of its flanges slotted as at 317 to receive therethrough mounting pins 318. The other flange extends substantially at right angles to the slotted flange and projects inwardly from the front of the vending machine a distance sufficient to dispose its rearmost end in an area rearwardly of the end wall 103 of the cam locking member 106.

A lip 319 provided on the free end of said flange extends at right angles thereto and underlies the lower edge of the cam locking element 106 in such manner that when the element 316 is pulled outwardly, or to the right as viewed in Fig. 6, said lip coacts with a cam surface 321 (Fig. 11) on the cam locking element 106 to thereby elevate said cam locking element a distance sufficient to withdraw its locking lug 102 out of the path of the slide plate 85. The upper free edge of the element 316 is provided with a cam surface 322 to cooperate with a shoulder 323 provided on the end of a U-shaped extension 324 carried on and firmly secured, as by welding, to the other cam locking element 105. Accordingly, movement of the element 316 in a direction to raise the cam locking element 106 is effective, also, to elevate the cam locking element 105 and thereby remove its locking lug 101 out of the path of the slide 85.

In order to prevent inadvertent nonsetting of the element 316 after it has been moved into its unlocking position, the forward or free end of said element is provided with a finger piece 325 bent substantially at right angles thereto. This finger piece normally lies immediately in the rear of the front wall of the cabinet 12. Consequently, it cannot be moved or retained in cam unlocking position under any conditions other than when the vending machine cabinet is open. Immediately upon closing said vending machine cabinet, the finger piece 325 is contacted by the front wall thereof and is moved into its normal ineffective position.

Although an exemplary form of the present invention has been disclosed in detail in the accompanying drawings, and specifically described in the foregoing specification, it should be understood that the invention may embody a wide variety of modifications in detail structure, organization and association of parts without departing from the spirit of the invention or the scope of the appended claims.

We claim:

1. In a coin-controlled mechanism having a plurality of slidable members, means normally locking said members against movement in one direction, means responsive to the insertion of a coin of predetermined denomination to unlock said members, mechanism effective when actuated to discharge a coin from a supply of coins, said mechanism having a slidable connection with one of said slidable members, a latch associated with said connection effective to prevent relative sliding between the coin discharge mechanism and said one slidable member whereby the discharge mechanism is actuated upon sliding of said slidable member, and a cam element in the coin-controlled mechanism effective when a coin or coins of lesser denomination are inserted in the mechanism to engage and release said latch so as to permit actuation of the coin-controlled means without actuating the coin discharge mechanism.

2. In a coin-controlled mechanism including spaced apart plates between which a coin is adapted to pass, a pair of slidable members between said plates one in advance of the other, a pair of locking members in the path of the advance member to limit sliding movement of said members in one direction, a pair of cam elements on the advance member each extending through an opening into the space between the plates, said cam elements extending in the direction of and being positioned to coact with the locking members, means to support a coin in the space between the plates and in the path of one of said cam elements, said one cam element acting to move its related locking member out of the path of the advance sliding member when a coin is supported in its path whereby both sliding members may be advanced along a part of their intended movement, the second cam element being slidable relative to its mounting on the advance member, and means on the second cam element engageable by the other slidable member during initial sliding of said member to move said second cam and cause it to move its related locking member out of the path of the advance sliding member whereby both sliding members may be advanced through the complete operating cycle.

3. In a coin-controlled mechanism, a plurality of slidable members, means normally locking said members against movement in one direction, means conditioned in the presence of a coin effective to move said locking means into unlocking position, and normally ineffective gravity controlled means effective to lock said slidable members when the mechanism is struck a blow in a direction sufficiently to cause said locking means to move into unlocking position.

4. In a coin-controlled mechanism, a plurality of slidable members, spring held means normally locking said members against movement in one direction, means conditioned upon the presence of a coin effective to move said locking means into unlocking position, and normally ineffective gravity controlled means effective to lock said slidable members when the mechanism is struck a blow in said one direction sufficiently to cause said spring held means to move into unlocking position.

5. In a coin-controlled mechanism including spaced apart plates between which a coin is adapted to pass, a manually movable sliding member between the plates having a portion extending through slots in one of said plates, a cam element on said extending portion of the sliding member extending into the space between said plates, means to support a coin between said plates, a locking member in the path of the cam element having a portion normally lying in the path of the sliding member to prevent its sliding in one direction, said cam element being actuable to move the locking member into unlocking position when a coin is located between the plates in the path of said cam element and the sliding member is initially moved in one direction, a second cam element mounted for limited sliding movement on the extending portion of said sliding member, a second locking member in the path of the second cam element having a portion lying in the path of said sliding member, and a second independently operable sliding member between said plates movable in unison with the first sliding member to engage and move the second cam element into operative engagement with the second locking member and move it out of locking position.

6. In a coin-controlled mechanism including spaced apart plates between which a coin is adapted to pass, a pair of sliding members carried by the plates one in advance of the other, said sliding members being movable in a common plane, means operable to move said sliding members, a pair of cam elements on the leading sliding member each extending through an opening into the space between the plates, separate locking members in the path of said leading sliding member to limit sliding movement of both members in one direction, said cam elements being movable with the leading sliding member and positioned to co-act with the locking members, one of said cam elements acting upon initial movement of the leading sliding member to move its related locking member out of the path of the leading sliding member when one coin is supported between the plates in the path of said one cam element, whereby both sliding members and both cam elements may be advanced a predetermined distance, and means on the second cam element engageable by the other sliding member when the latter has advanced said predetermined distance effective upon continued movement of both sliding members to cause said second cam element to move its related locking member out of the path of the leading sliding member whereby both sliding members may be advanced through a complete operating cycle.

7. In a coin-controlled mechanism having two members slideable in a common plane, one in advance of the other, selective means to slide the leading member, means to slide both members, means normally locking the leading member against unlimited movement in one direction, means on the leading member restraining the trailing member against unlimited movement in said one direction, means responsive to the presence in said mechanism of a coin of predetermined value to unlock said leading member whereby both members may be moved in said one direction, mechanism effective when actuated to discharge a coin from a supply of coins, said mechanism including a bracket having a slideable connection with the trailing slideable member, latch means on said bracket effective to prevent relative sliding between the bracket and said trailing slideable member so that the discharge mechanism is actuated upon sliding of both of said slideable members, and cam means actuable when both slideable members are moved during the presence in said mechanism of a single coin of less predetermined value than the coin aforesaid to release said latch means so that the coin discharge mechanism remains inoperative.

8. In a coin-controlled mechanism having two members slideable in a common plane, one in advance of the other, selective means to slide the leading member, means to slide both members, means normally locking the leading member against unlimited movement in one direction, means on the leading member restraining the trailing member against unlimited movement in said one direction, means responsive to the presence in said mechanism of a coin of predetermined value to unlock said leading member whereby both members may be moved in said one direction, mechanism effective when actuated to discharge a coin from a supply of coins, said mechanism including a bracket having a slideable connection with the trailing slideable member, latch means on said bracket effective to prevent relative sliding between the bracket and said trailing slideable member so that the discharge mechanism is actuated upon sliding of both of said slideable members, and cam means actuable when the leading slideable member only is moved during the presence in said mechanism of several coins equaling the value of the single coin aforesaid so that the coin discharge mechanism remains inoperative.

9. In a coin-controlled mechanism, a slideable member, means normally locking said member against movement in one direction, means conditioned upon the presence of a coin effective to move said locking means into unlocking position, and normally ineffective gravity controlled means effective to lock said slideable member when the mechanism is struck a blow in said one direction sufficiently to cause said first named locking means to move into unlocking position.

HARRY B. STONER.
EDWIN PARRE.
GORDON ROGERS.

References Cited in the file of this patent

UNITED STATES PATENTS

| Number | Name | Date |
|---|---|---|
| 883,886 | Huffman | Apr. 7, 1908 |
| 1,938,815 | Du Grenier | Dec. 12, 1933 |
| 1,939,127 | Martin | Dec. 12, 1933 |
| 1,983,073 | Du Grenier | Dec. 4, 1934 |
| 2,185,148 | Evans et al. | Dec. 26, 1939 |
| 2,247,888 | Neidig | July 1, 1941 |
| 2,324,040 | Stoner et al. | July 13, 1943 |
| 2,429,148 | Wilder | Oct. 14, 1947 |
| 2,453,398 | Auerbach | Nov. 9, 1948 |
| 2,504,990 | Leschin | Apr. 25, 1950 |
| 2,529,196 | Stoner | Nov. 7, 1950 |